(12) United States Patent
Frost

(10) Patent No.: US 10,687,636 B2
(45) Date of Patent: Jun. 23, 2020

(54) RETAIL UPRIGHT SHELF EXTENDER

(71) Applicant: VANGUARD PACKAGING, INC., Kansas City, MO (US)

(72) Inventor: Jerry Ryan Frost, Kansas City, MO (US)

(73) Assignee: Vanguard Packaging, LLC, Kansas City, MO (US)

( * ) Notice: Subject to any disclaimer, the term of this patent is extended or adjusted under 35 U.S.C. 154(b) by 0 days.

(21) Appl. No.: 15/687,791

(22) Filed: Aug. 28, 2017

(65) Prior Publication Data
US 2017/0354272 A1    Dec. 14, 2017

Related U.S. Application Data

(63) Continuation of application No. 14/595,988, filed on Jan. 13, 2015, now Pat. No. 9,743,782.

(Continued)

(51) Int. Cl.
*A47F 5/00*    (2006.01)
*B31D 5/04*    (2017.01)
(Continued)

(52) U.S. Cl.
CPC .............. *A47F 5/00* (2013.01); *A47F 5/0068* (2013.01); *A47F 5/112* (2013.01); *B31D 5/04* (2013.01);
(Continued)

(58) Field of Classification Search
CPC .......... A47F 5/00; A47F 5/0068; A47F 5/112; A47F 2005/0075; B31D 5/04; F16M 13/02; A47B 96/14
See application file for complete search history.

(56) References Cited

U.S. PATENT DOCUMENTS 2,609,136 A * 9/1952 Sider ...................... B65D 5/505
                                                  108/51.3
2,798,685 A * 7/1957 Mooney ............. B65D 19/0028
                                                  108/51.3
(Continued)

FOREIGN PATENT DOCUMENTS

FR        2380129 A1    9/1978

OTHER PUBLICATIONS

"English translation of FR 2380129 A1".
(Continued)

*Primary Examiner* — Kimberly T Wood
(74) *Attorney, Agent, or Firm* — Kutak Rock LLP

(57) ABSTRACT

A corrugated shelf extender having an upper section and a lower section is provided. The lower section is configured to be received by an inner area of a vertical support post. The upper section is configured to extend above the vertical support post so as to provide support for signage or the like. The lower section includes a channel that is configured so as to enable a section of the vertical support post that receives the lower section of the shelf extender to be simultaneously utilized by the shelf extender and one or more mounting lug. The corrugated shelf extender is manufactured from a flat piece of continuous corrugated material by folding the corrugated material so as to fabricate an inner portion and an outer portion. The inner portion includes an upper portion that nests within the outer portion and a lower portion that extends from the outer portion such that the upper section of the shelf extender includes the outer portion and the upper portion of the inner portion and the lower section of the shelf extender includes the lower portion of the inner portion.

18 Claims, 8 Drawing Sheets

Related U.S. Application Data

(60) Provisional application No. 61/926,805, filed on Jan. 13, 2014.

(51) Int. Cl.
*F16M 13/02* (2006.01)
*A47F 5/11* (2006.01)
*A47B 96/14* (2006.01)

(52) U.S. Cl.
CPC ............. *F16M 13/02* (2013.01); *A47B 96/14* (2013.01); *A47F 2005/0075* (2013.01)

(56) References Cited

U.S. PATENT DOCUMENTS

| | | | |
|---|---|---|---|
| 4,050,386 A * | 9/1977 | Kellogg | A47B 47/024 |
| | | | 108/190 |
| 4,102,276 A * | 7/1978 | Roveroni | A47B 47/06 |
| | | | 108/156 |
| 4,248,350 A * | 2/1981 | Gilbert | B65D 5/5033 |
| | | | 206/320 |
| 4,638,745 A | 1/1987 | Sheffer | |
| 4,863,024 A * | 9/1989 | Booth | B65D 19/0016 |
| | | | 206/386 |
| 6,155,441 A | 12/2000 | Andersen | |
| 7,137,517 B2 | 11/2006 | Lowry et al. | |
| 8,459,190 B2 * | 6/2013 | Erdie | B65D 5/0254 |
| | | | 108/51.3 |
| 9,743,782 B1 * | 8/2017 | Frost | A47F 5/00 |
| 9,783,333 B1 * | 10/2017 | De Los Santos | B65D 5/006 |
| 2006/0157380 A1 * | 7/2006 | Lowry | B65D 5/5033 |
| | | | 206/594 |
| 2007/0095767 A1 * | 5/2007 | Henke | A47F 5/101 |
| | | | 211/103 |

OTHER PUBLICATIONS

"Non-Final office action received for U.S. Appl. No. 14/595,988 dated Apr. 20, 2016", 9 pages.
"Notice of Allowance Received for U.S. Appl. No. 14/595,988 dated Apr. 24, 2017", 12 pages.
"Final Office Action received for U.S. Appl. No. 14/595,988, dated Jan. 12, 2017", 14 pages.

* cited by examiner

PRIOR ART

RETAIL UPRIGHT SHELF EXTENDER

CROSS-REFERENCE TO RELATED APPLICATIONS

This application is a divisional application of U.S. patent application Ser. No. 14/595,988, filed Jan. 13, 2015 (now U.S. Pat. No. 9,743,782, granted on Aug. 29, 2017), which claims priority pursuant to 35 U.S.C. 119(e) to U.S. Provisional Patent Application Ser. No. 61/926,805 filed Jan. 13, 2014, the entire disclosures of which are incorporated herein by reference.

FIELD OF THE INVENTION

The present invention relates generally to the field of retail point of purchase shelving and displays. More specifically, the present invention is concerned with a corrugated, paperboard upright shelf extender that is manufactured in a fold and glue assembly line and typically provided to an end user in a collapsed or knock-down configuration for easy setup.

BACKGROUND OF THE INVENTION

Corrugated containers are made from pieces of flat paperboard stock material that are die cut into shapes that define various panels. The shapes are folded along predefined lines between the panels with at least one overlapping strip or panel that is glued, taped or otherwise affixed to another panel to form an enclosed boundary. The panels are folded into place to become the walls of the container. The containers are traditionally provided to product manufacturers in a collapsed or knock-down configuration for storage, handling and shipping. The manufacturer opens the knock-down containers and folds appropriately to utilize the assembled container for packing products therein.

The knock-down containers are typically manufactured by feeding flat die cut sheets through a fold-and-glue machine. The fold-and-glue machine applies adhesive and folds over select panels so that the panels are in the knock-down configuration.

Many retailers, such as grocery stores, convenience stores, department stores, etc., display products to their customers on metal shelving units positioned throughout the retail floor space. These metal shelving units often include one or more vertical support post. Each vertical support post defines an inner area and a plurality of spaced-apart keyholes. The keyholes are configured to receive mounting lugs such that when a mounting lug is received by a keyhole, a portion of the mounting lug is positioned within the inner area of the vertical support and a portion of the mounting lug is positioned such that the mounting lug is capable of supporting at least a portion of a shelf. The keyholes of adjacent vertical support posts are positioned relative to each other such that a single shelf can be supported by a plurality of vertical support posts at a variety of heights without adjusting the height of any of the vertical support posts or adjusting the location of any of the keyholes.

Often retailers will include signage at the top of shelving utilizing an upright pole extender that fits into the top of a vertical support post. Such upright pole extenders are traditionally made out of metal in much the same manner as the support posts for the shelves themselves. Often, an upright extender includes a lower end that has a smaller diameter/dimension than the upper end of the extender. In this manner, the lower end fits within the inner area of the vertical support post tubing, while the outer surface of the upper end is generally flush with the outer surface of the support post. The upper end of the extender further includes a number of keyholes for accepting mounting lugs of the signage that is attached to the shelf extenders.

Metal shelf extenders are relatively heavy, non-recyclable, and expensive to manufacture. These shelf extenders can be easily damaged and often are inadvertently discarded with the signage. In addition, because of the expense, metal shelf extenders of the prior art are typically intended to be reused multiple times. Thus, in most cases the signage must be assembled onsite at the retail sales floor, adding to the amount of labor and expense required at the retail location. Therefore, it would be beneficial to provide an upright shelf extender and method of making the same out of corrugated paperboard material, such that the shelf extender can be manufactured in a less-costly manner and is capable of being recycled.

SUMMARY OF THE INVENTION

The present invention comprises a corrugated paperboard upright shelf extender. In some embodiments, the shelf extender is made from a single piece of corrugated material that is precut to result in the design shown in FIG. 1 that includes multiple panels that fold against and/or around one another. In some such embodiments, the panels are separated by pre-perforated lines for easier folding and assembly.

The shelf extender of the inventive concept provides a lower cost alternative to those of the prior art. In addition, the shelf extender of the inventive concept is made of recyclable materials. In some embodiments, the shelf extender of the inventive concept is provided to retailers in a knockdown form and assembled on site on the retail floor. In other embodiments, the shelf extender is assembled at an alternative location along with the signage. Because the shelf extender is made of recyclable material, the shelf extender can be discarded along with the signage when the signage is no longer in use by the retailer. This can result in significant labor savings by the retailer or other end user.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

Figure 1:
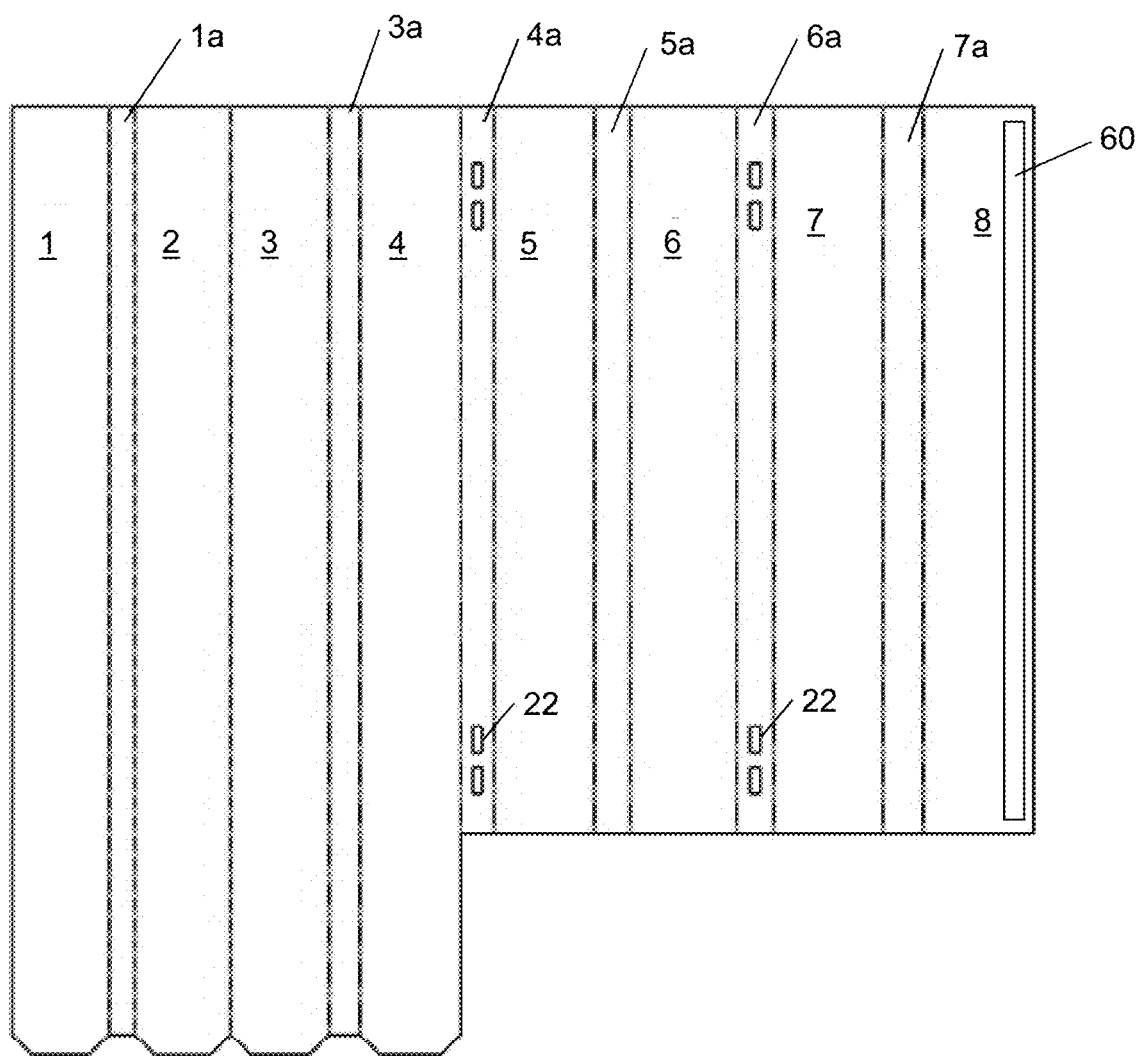
FIG. 1 is a top view of a flat piece of corrugated material that has been die cut and pre-creased and/or perforated to form a knockdown for an upright shelf extender of an embodiment of the inventive concept.
Figure 2:
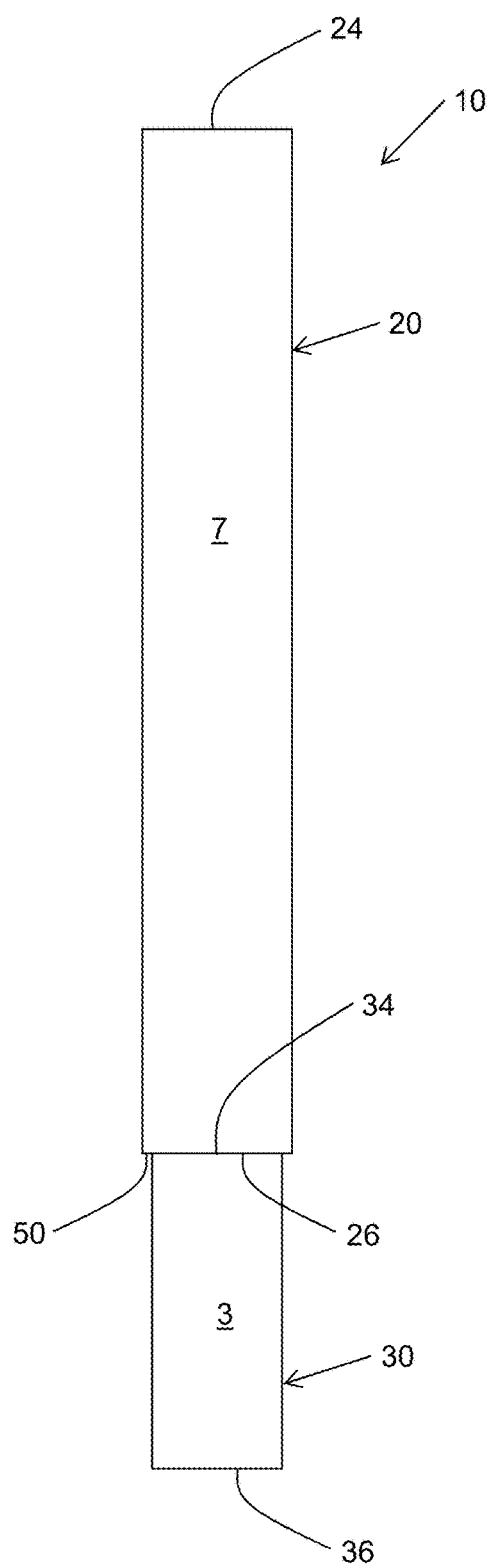
FIG. 2 is a side view of an upright shelf extender of an embodiment of the inventive concept.
Figure 3A:
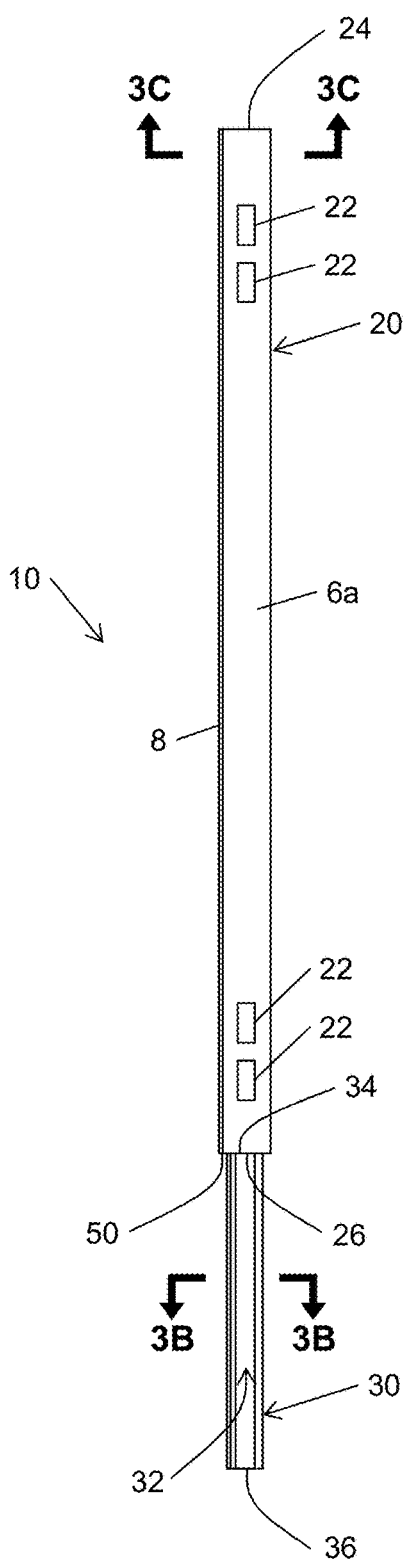
FIG. 3A is a front view of the upright shelf extender of FIG. 2.
Figure 3B:
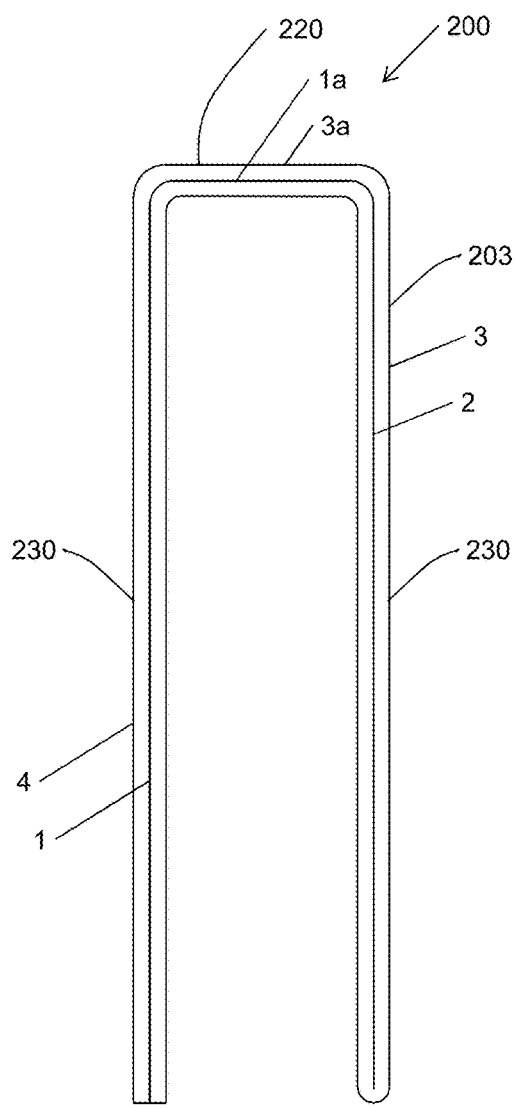
FIG. 3B is an enlarged sectional view taken along line 3B-3B.
Figure 3C:
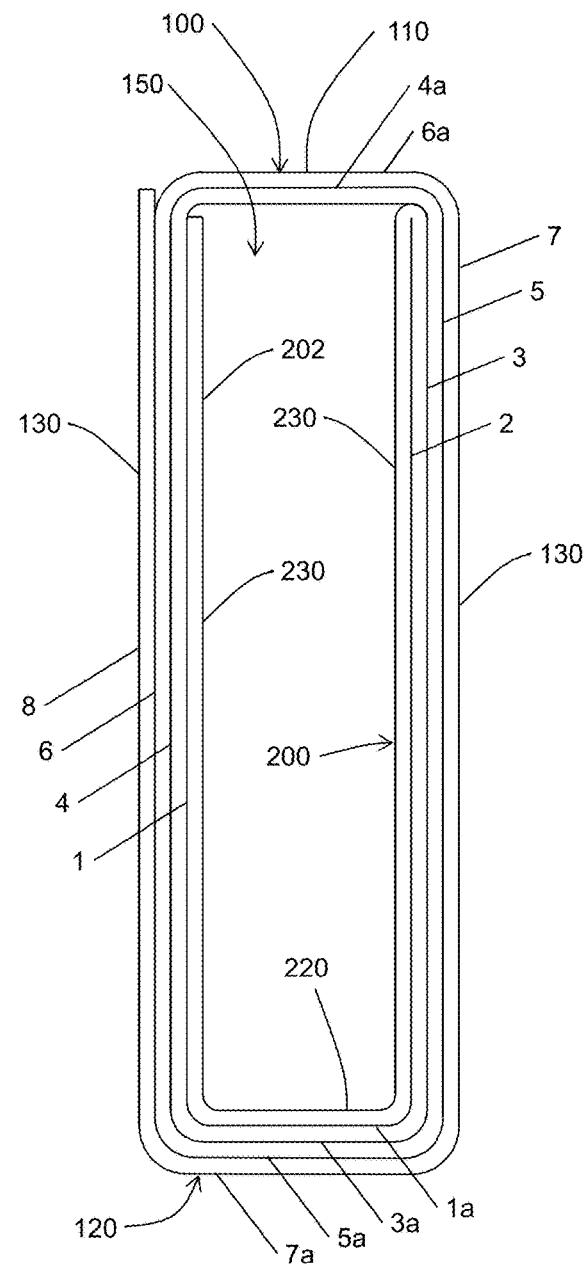
FIG. 3C is an enlarged sectional view taken along line 3C-3C.
Figure 4A:
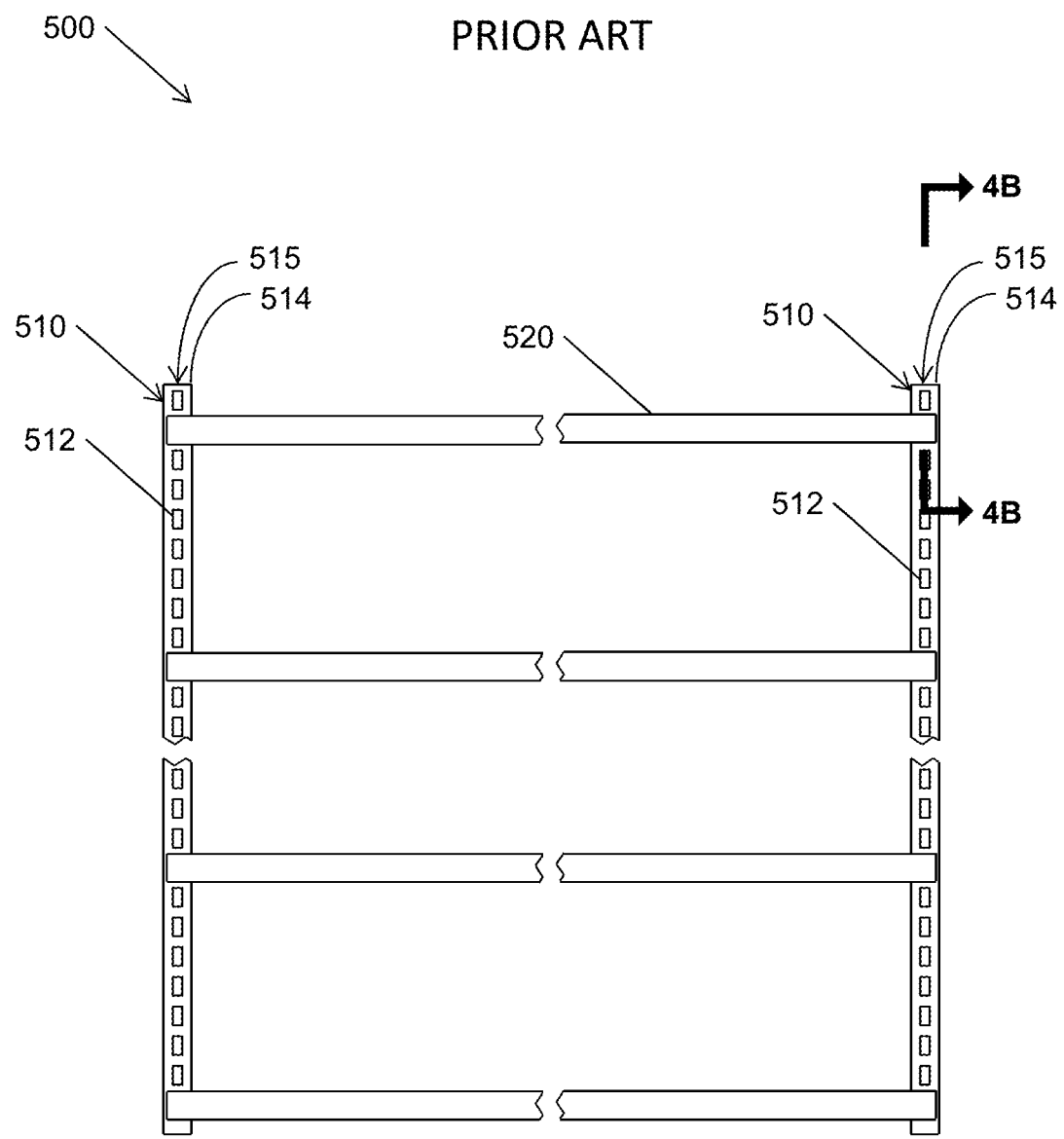
FIG. 4A is a front view of a shelving unit of the prior art.
Figure 4B:
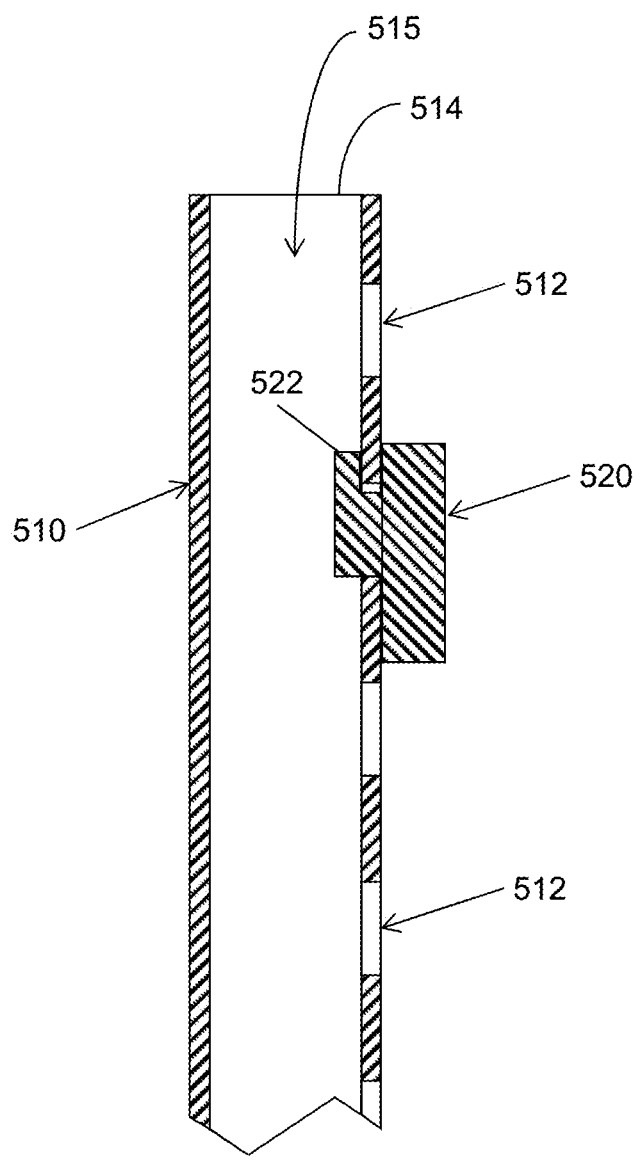
FIG. 4B is an enlarged sectional view taken along line 4B-4B of FIG. 4A.
Figure 4C:
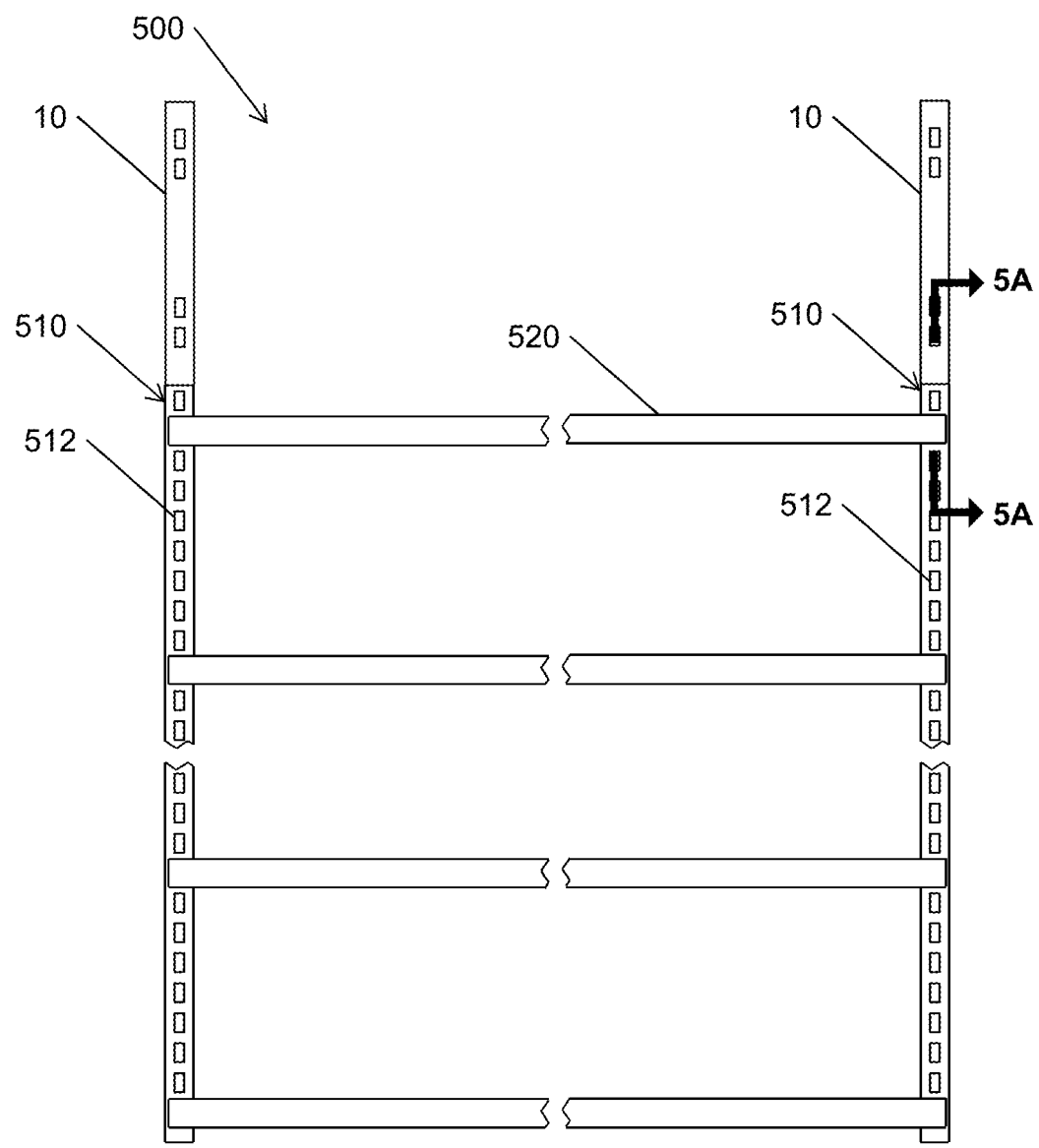
FIG. 4C is a front view showing upright shelf extenders of FIG. 2 extending vertically from vertical support posts of the shelving unit of FIG. 4A.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 2 through 5, the shelf extender 10 includes an upper section 20 and a lower section 30. In some embodiments, the upper 20 and lower 30 sections define relatively consistent cross sections with the cross section of the lower section 30 being somewhat smaller than the cross section of the upper section 20 such that the transition from the upper section 20 to the lower section 30 generally defines a ledge 50. More specifically, the cross section of the upper section 20 of the shelf extender 10 defines approximately the same exterior surfaces as a cross section of a vertical support post 510 of a shelving unit 500 while the cross section of the lower section 30 of the shelf extender 10 defines a profile that is configured to be received within an inner area 515 of the vertical support post.

In use, the lower section 30 of the shelf extender 10 is inserted into the inner area 512 of the vertical support post 510 of an existing shelving unit 500 with the upper section 20 of the shelf extender 10 extending vertically above the vertical support post 510 such that the shelf extender 10 of the present invention is supported by the vertical support post 510 of the shelving unit 500. In some embodiments, the ledge 50 of the shelf extender 10 nests against a top edge 514 of the vertical support post.

The upper 20 and lower 30 sections include respective top 24, 34 and bottom 26, 36 ends. In some embodiments, the bottom end 26 of the upper section 20 is adjacent to the top end 34 of the lower section 30 such that the transition from the upper section 20 to the lower section 30 defines the ledge 50. In some such embodiments, the top end 24 of the upper section 20 is displaced upwardly from the ledge 50 and the bottom end 36 of the lower section 30 is displaced downwardly from the ledge 50.

Figure 5A:
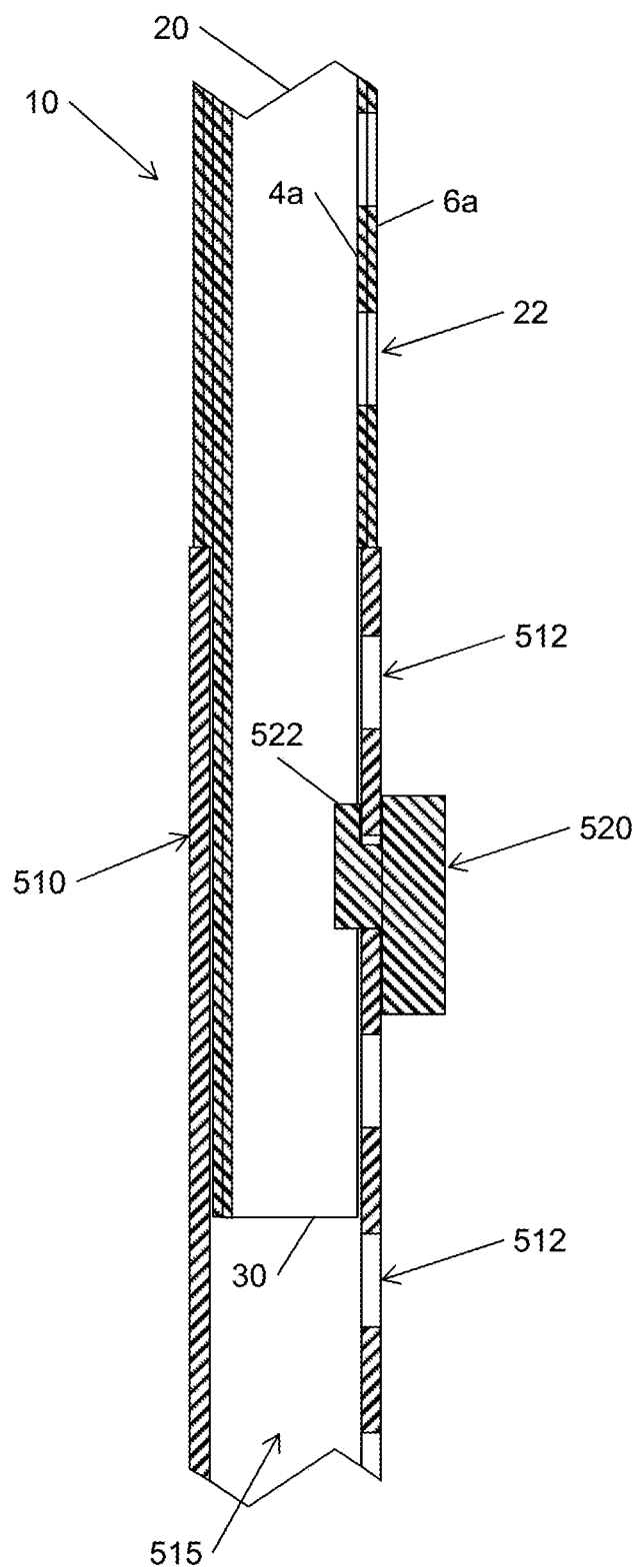
FIG. 5A is an enlarged sectional view taken along line 5A-5A of FIG. 4.
Figure 5B:
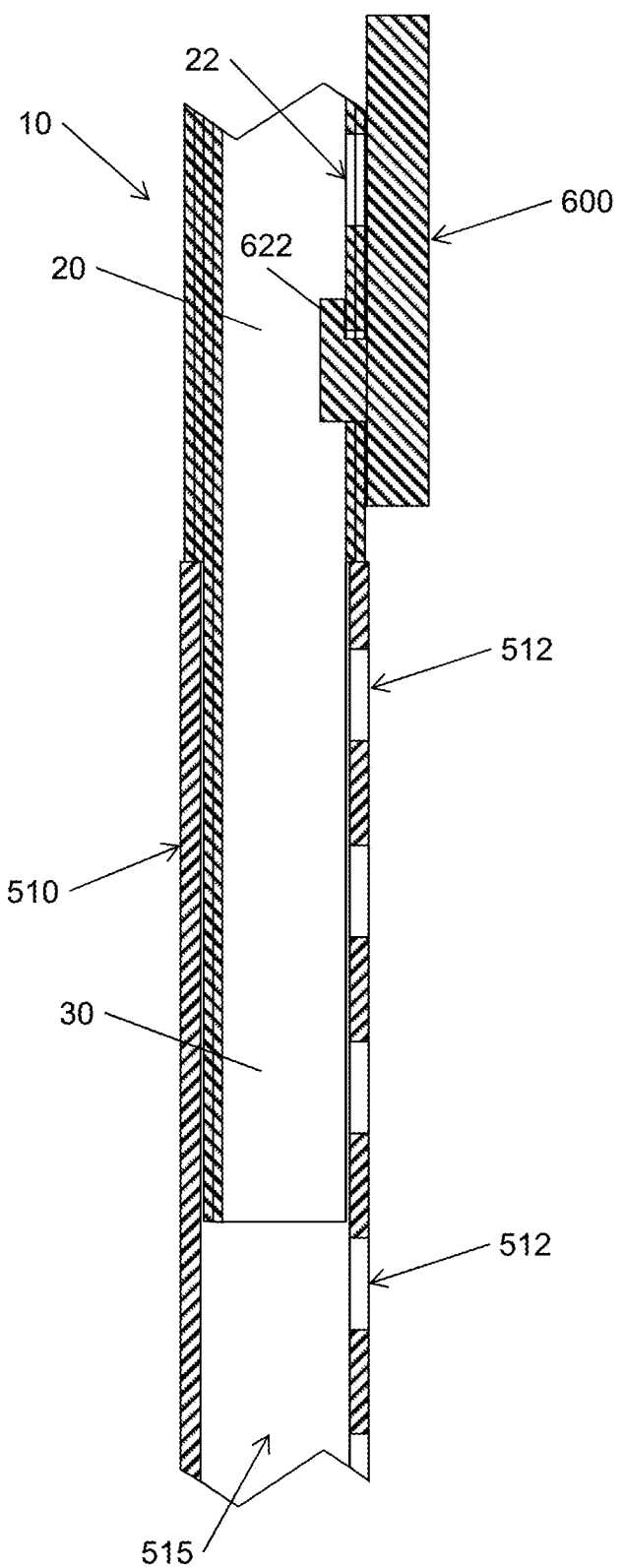
FIG. 5B is the enlarged sectional view of FIG. 5A with a shelf and corresponding mounting lug being removed and signage and a corresponding lug being added.

In some embodiments, such as shown in FIG. 5B, the upper section 20 of the shelf extender 10 defines one or more feature that is configured to assist in utilizing the shelf extender 10 to support signage 600 or the like. In some such embodiments, the feature is a keyhole 22 that is configured to receive a mounting lug 622. In other such embodiments, a plurality of keyholes are strategically positioned between the top 24 and bottom 26 ends of the upper section 20 of the shelf extender 10. It will be appreciated that, in still other embodiments, one or more other features that are well known in the art are utilized instead of, or in addition to, one or more keyhole 22.

In some embodiments, the lower section 30 of the shelf extender 10 defines a channel 32. In some such embodiments, the channel 32 is configured so as to provide clearance within the inner area of the vertical support post for various features used in conjunction with the vertical support post. More particularly, as shown in FIG. 5A, some such embodiments are configured such that when the lower section 30 of the shelf extender 10 is received by a vertical support post 510, the lower section 30 of the shelf extender 10 does not prevent a mounting lug 522, such as a mounting lug 522 of a shelf member 520 of the shelving unit 500, from being received by a keyhole 512 of the vertical support post 510. Furthermore, in some embodiments, the channel 32 is configured such that when a mounting lug 522 is received by a keyhole 512 of a vertical support post 510, the mounting lug 522 does not prevent the lower section 30 of the shelf extender 10 from being received by the vertical support post 510. Furthermore still, in some embodiments, the channel 32 is configured such that when the lower section 30 of the shelf extender 10 is received by a vertical support post 510 and a mounting lug 522 is received by a keyhole 512 of the vertical support post 510, the mounting lug does not prevent the lower section 30 of the shelf extender 10 from being removed from the vertical support post 510 and the lower section 30 of the shelf extender 10 does not prevent the mounting lug 522 from being removed from the keyhole 512. In this way, the shelf extender 10 does not prevent the vertical support post 510 from supporting shelving 520 and shelving 520 does not prevent the vertical support post from supporting the shelf extender 10. It will be appreciated that in various embodiments the mounting lug 522 will be one or more tab, bracket, clip, or any number of one or more other features that are well known in the art for being inserted into keyholes 512 so as to support shelving 520 and/or to otherwise display products.

In some embodiments of the present invention, the shelf extender 10 includes an elongated outer portion 100 that extends from the top end 24 of the upper section 20 to the bottom end 26 of the upper section 20. In some such embodiments, the outer portion 100 includes opposed front 110 and rear 120 panels extending between the top 24 and bottom 26 ends of the upper section 20 and opposed side panels 130 extending between the opposed front 110 and rear 120 panels so as to define an elongated inner area 150. In some such embodiments, a cross section of the outer portion 100 generally defines a rectangular tube.

In some embodiments of the present invention, the shelf extender 10 further includes an elongated inner portion 200 that extends from a bottom end 36 of the lower section 30, past the top end 34 of the lower section 30, towards the top end 24 of the upper section 20. In some such embodiments, the inner portion 200 extends to the top end 24 of the upper section 20. Some embodiments of the inner portion 200 includes opposed side panels 230 (also referred to as side walls 230) extending between the top 140 and bottom 150 ends and a rear panel 220 (also referred to as a rear wall 220) extending between the opposed side panels 230 so as to define a channel 32. In some such embodiments, a cross section of the inner portion 200 generally defines a U-shape.

In some embodiments of the present invention, the inner portion 200 includes an upper portion 202 nested within the inner area 150 of the outer portion 100 and a lower portion 203 extending beyond the outer portion 100 of the shelf extender 10 such that the upper section 20 of the shelf extender 10 comprises the outer portion 100 and the upper portion 202 of the inner portion 200 while the lower section 30 of the shelf extender 10 comprises the lower portion 203 of the inner portion 200.

The present invention further includes various methods of manufacturing a shelf extender 10. One such method includes die-cutting a continuous piece of corrugated material into a design (such as the design shown in FIG. 1) that includes multiple panels that fold against and/or around one another. In some embodiments, the panels are separated by pre-perforated lines for easier folding and assembly. In some such embodiments, the shelf extender 10 is shipped in a flat (knock-down) configuration, for ease of storage and shipping, and then moved to a three-dimensional configuration prior to being used to support signage or the like.

FIG. 1 shows one example of the present invention in a flat configuration laying on a planar surface, such as a table surface. Specifically, the embodiment includes multiple panels separated by perforated lines for easier folding and assembly. The shelf extender 10 is moved to the three-dimensional configuration by first folding a first primary panel 1, a first secondary panel 1a, and a second primary panel 2 up and over until panels 1, 1a, and 2 rest against a fourth primary panel 4, a third secondary panel 3a, and a third primary panel 3, respectively. In the presently described embodiment, there is no second secondary panel 2a (not shown). Panels 2 and 3 are then folded up approximately 90 degrees such that panels 2 and 3 extend generally perpendicularly from the table surface. Next, panels 1a and 3a are folded up approximately 90 degrees such that panels 1a and 2a extend generally perpendicularly from the table surface, thereby moving panels 2 and 3 into a position and orientation that is displaced from and generally parallel with panels 1 and 4. In this way, panels 1, 1a, 2, 3, 3a, and 4, together, define the inner portion 200 of the shelf extender 10, with panels 1a and 3a, together, defining the rear panel 220; and panels 1 and 4, together, and panels 2 and 3, together, defining opposed side panels 230.

After the inner portion 200 of the shelf extender 10 is formed, as discussed above, the remaining panels are then folded/wrapped around the assembly to form the outer portion 100 of the shelf extender 10. Specifically, a fourth secondary panel 4a is folded up approximately 90 degrees such that panel 4a extends between the opposed side panels 230 of the inner portion 200 of the shelf extender 10, followed by a fifth primary panel 5 being folded over panel 3, a fifth secondary panel 5a being folded over panel 3a, a sixth primary panel 6 being folded over panel 4, a sixth secondary panel 6a being folded over panel 4a, a seventh primary panel 7 being folded over panel 5, a seventh secondary panel 7a being folded over panel 5a, and finally an eighth primary panel 8 being folded over panel 6. In this way, panels 4a, 5, 5a, 6, 6a, 7, 7a, and 8, together, define the outer portion 100 of the shelf extender 10 with panels 4a and 6a, together, defining the front panel 110; panels 5 and 7, together, and panels 6 and 8, together, defining opposed side panels 130; and panels 5a and 7a, together, defining the rear panel 120.

In some embodiments, panel 8 includes an adhesive strip 60. In such embodiments, prior to folding panel 8 against panel 6, the backing from the adhesive strip 60 is removed to expose the adhesive. Panel 8 is then adhered to panel 6 using the adhesive and holding the entire assembly together.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A shelf extender for extending vertically above a vertical support post of a shelving unit, the shelf extender comprising:
   an upper section made of a second set of panels wrapped about a first set of panels, said first set of panels defining an inner portion of said upper section and said second set of panels defining an outer portion of said upper section; and
   a lower section having opposed side walls and a rear wall extending between said opposed side walls such that said lower section defines a channel having an open front,
   wherein said lower section is configured to be received by an inner area of the vertical support post such that said upper section extends above the vertical support post, and
   wherein said lower section is formed from said first set of panels extending below a bottom edge of said second set of panels.

2. The shelf extender of claim 1, wherein said panels are formed from a corrugated material.

3. The shelf extender of claim 1, wherein said channel is configured so as to provide clearance for a mounting lug to be received by a keyhole of the vertical support post when said lower section of the shelf extender is received by the vertical support post.

4. The shelf extender of claim 1, wherein said channel is configured so as to provide clearance for said lower section of the shelf extender to be received by the vertical support post when a mounting lug is received by a keyhole of the vertical support post.

5. The shelf extender of claim 1, wherein said second set of panels defines an inner area having a bottom opening defined by bottom edges of said second set of panels, wherein said first set of panels extends from said inner area of said second set of panels through said bottom opening so as to define said lower section, and wherein said bottom edges of said second set of panels are configured to interface with corresponding top edges of walls of the vertical support post when said lower section is received by the inner area of the vertical support post, thereby providing a vertical support for the shelf extender.

6. The shelf extender of claim 1, wherein said first set of panels comprises:
   a first secondary panel extending between first and second primary panels; and
   a third secondary panel extending between third and fourth primary panels,
   wherein said third primary panel is folded over onto said second primary panel so as to form a first of said opposed side walls of said lower section and a corresponding first side wall of said inner portion of said upper section,
   wherein said third secondary panel nests against said first secondary panel so as to define said rear wall of said lower section and a corresponding rear wall of said inner portion of said upper section,
   wherein said fourth primary panel is folded up and away from said third secondary panel until said fourth primary panel is perpendicular to said third secondary panel, and
   wherein said first primary panel is folded up against said fourth primary panel so as to form a second of said opposed side walls of said lower section and a corresponding second side wall of said inner portion of said upper section.

7. The shelf extender of claim 6, wherein said second set of panels comprises:
   a fourth secondary panel having a proximal edge coupled to said fourth primary panel, said fourth secondary panel extending between said first and second side walls of said inner portion of said upper section;
   a fifth primary panel having a proximal edge coupled to a distal edge of said fourth secondary panel, said fifth primary panel extending along said first side wall of said inner portion of said upper section;
   a fifth secondary panel having a proximal edge coupled to a distal edge of said fifth primary panel, said fifth secondary panel extending along said rear wall of said inner portion of said upper section; and
   a sixth primary panel having a proximal edge coupled to a distal edge of said fifth secondary panel, said sixth primary panel extending along said second side wall of said inner portion of said upper section.

8. The shelf extender of claim 7 wherein said fourth secondary panel defines a plurality of keyholes.

9. The shelf extender of claim 7, wherein said second set of panels further comprises:
   a sixth secondary panel having a proximal edge coupled to said sixth primary panel, said sixth secondary panel extending along said fourth secondary panel;
   a seventh primary panel having a proximal edge coupled to a distal edge of said sixth secondary panel, said seventh primary panel extending along said fifth primary panel;
   a seventh secondary panel having a proximal edge coupled to a distal edge of said seventh primary panel, said seventh secondary panel extending along said fifth secondary panel; and
   an eighth primary panel having a proximal edge coupled to a distal edge of said seventh secondary panel, said eighth primary panel extending along said sixth primary panel.

10. The shelf extender of claim 9 wherein said fourth and sixth secondary panels each define a plurality of corresponding keyholes such that each of said plurality of corresponding keyholes of said sixth secondary panel aligns with one of said plurality of corresponding keyholes of said fourth secondary panel.

11. A shelf extender moveable between a flat configuration for storage and an erected configuration for extending vertically above a vertical support post of a shelving unit, the shelf extender comprising:
   an inner portion formed from a first set of connected panels; and
   an outer portion formed from a second set of connected panels,
   wherein the erected configuration of said outer portion defines an inner area,
   wherein the erected configuration of said inner portion includes:
      an upper portion positioned within said inner area of said outer portion, thereby forming an upper section of the shelf extender; and
      a lower portion extending from a bottom opening of said upper portion, thereby forming a lower section of the shelf extender,
   wherein said lower section comprises opposed side walls and a rear wall extending between said opposed side walls such that said lower section defines a channel having an open front, wherein said lower section is configured to be received by an inner area of the vertical support post such that said upper section extends above the vertical support post, and
   wherein a distal end of the flat configuration of said first set of connected panels is coupled to a proximal end of the flat configuration of said second set of connected panels such that each of the panels are formed from a single flat piece of material.

12. The shelf extender of claim 11, wherein said panels are formed from a corrugated material.

13. The corrugated shelf extender of claim 11, wherein said open front of said lower section is configured so as to allow a mounting lug received by a keyhole of the vertical support post to extend into said channel of said lower section when said lower section of the shelf extender is received by the vertical support post.

14. The corrugated shelf extender of claim 11, wherein said open front of said lower section is configured so as to allow a mounting lug received by a keyhole of the vertical support post to extend into said channel of said lower section as said lower section of the shelf extender is being received by the vertical support post.

15. The corrugated shelf extender of claim 11 wherein said upper section of the shelf extender defines a plurality of keyholes.

16. The corrugated shelf extender of claim 11, wherein the flat configuration of said first set of panels comprises:
   a first secondary panel extending between first and second primary panels; and
   a third secondary panel extending between third and fourth primary panels,
   wherein a distal end of said second primary panel is coupled to a proximal end of said third primary panel,
   wherein said second and third primary panels are configured to fold against each other so as to form a first of said opposed side walls of said lower section and a corresponding first side wall of said upper portion of said inner portion, wherein said first and third secondary panels are configured to nest against each other so as to form said rear wall of said lower section and a corresponding rear wall of said upper portion of said inner portion, wherein said fourth primary panel is configured to fold up and away from said third secondary panel until said fourth primary panel is perpendicular to said third secondary panel, and wherein said first primary panel is configured to fold up against said fourth primary panel so as to form a second of said opposed side walls of said lower section and a corresponding second side wall of said upper portion of said inner portion.

17. The shelf extender of claim 16, wherein the flat configuration of said second set of panels comprises:
   a fourth secondary panel having a proximal edge coupled to said fourth primary panel, said fourth secondary panel being configured to extend between said first and second side walls of said upper portion of said inner portion;
   a fifth primary panel having a proximal edge coupled to a distal edge of said fourth secondary panel, said fifth primary panel being configured to extend along said first side wall of said upper portion of said inner portion;
   a fifth secondary panel having a proximal edge coupled to a distal edge of said fifth primary panel, said fifth secondary panel being configured to extend along said rear wall of said upper portion of said inner portion; and
   a sixth primary panel having a proximal edge coupled to a distal edge of said fifth secondary panel, said sixth primary panel being configured to extend along said second side wall of said upper portion of said inner portion.

18. The shelf extender of claim 17, wherein the flat configuration of said second set of panels further comprises:
   a sixth secondary panel having a proximal edge coupled to said sixth primary panel, said sixth secondary panel being configured to extend along said fourth secondary panel;
   a seventh primary panel having a proximal edge coupled to a distal edge of said sixth secondary panel, said seventh primary panel being configured to extend along said fifth primary panel;
   a seventh secondary panel having a proximal edge coupled to a distal edge of said seventh primary panel, said seventh secondary panel being configured to extend along said fifth secondary panel; and
   an eighth primary panel having a proximal edge coupled to a distal edge of said seventh secondary panel, said eighth primary panel being configured to extend along said sixth primary panel.

* * * * *